(12) United States Patent
Chiba et al.

(10) Patent No.: US 10,723,093 B2
(45) Date of Patent: Jul. 28, 2020

(54) PREFORM EXTRUSION MOLDING APPARATUS, METHOD FOR EXTRUSION MOLDING, AND PREFORM

(71) Applicants: Junichi Chiba, Isehara (JP); Kazuhiko Shimizu, Isehara (JP); Hiroshi Hosokoshiyama, Tokyo (JP)

(72) Inventors: Junichi Chiba, Isehara (JP); Kazuhiko Shimizu, Isehara (JP); Hiroshi Hosokoshiyama, Tokyo (JP)

(73) Assignee: YOSHINO KOGYOSHO CO., LTD., Tokyo (JP)

(*) Notice: Subject to any disclaimer, the term of this patent is extended or adjusted under 35 U.S.C. 154(b) by 85 days.

(21) Appl. No.: 15/868,720

(22) Filed: Jan. 11, 2018

(65) Prior Publication Data
US 2018/0178465 A1    Jun. 28, 2018

Related U.S. Application Data

(62) Division of application No. 14/359,154, filed as application No. PCT/JP2012/078662 on Nov. 6, 2012, now Pat. No. 9,956,707.

(30) Foreign Application Priority Data

Nov. 17, 2011 (JP) .................. 2011-251547

(51) Int. Cl.
*B29C 45/00* (2006.01)
*B29D 22/00* (2006.01)
(Continued)

(52) U.S. Cl.
CPC .............. *B29D 22/00* (2013.01); *B29B 11/08* (2013.01); *B29C 45/1603* (2013.01);
(Continued)

(58) Field of Classification Search
CPC .. B29C 45/1603; B29C 45/1646; B29B 11/08
See application file for complete search history.

(56) References Cited

U.S. PATENT DOCUMENTS 4,497,621 A    2/1985 Kudert et al.
4,511,528 A    4/1985 Kudert et al.
(Continued)

FOREIGN PATENT DOCUMENTS

JP    S63-99918 A    5/1988
JP    H04-49010 A    2/1992
(Continued)

OTHER PUBLICATIONS

Jan. 29, 2013 International Search Report issued in International Patent Application No. PCT/JP2012/078662.
(Continued)

*Primary Examiner* — Timothy Kennedy
(74) *Attorney, Agent, or Firm* — Oliff PLC

(57) ABSTRACT

A process includes: supplying a main resin from outer and inner flow channel, to a joined flow channel at a predetermined supply velocity for a predetermined time; supplying a second resin from a middle flow channel to the joined flow channel simultaneously with the main resin at a predetermined supply velocity for a certain time within the predetermined time; and sliding a shut-off pin to bring the pin forefront to a predetermined position near an outlet of the inner flow channel, open to the joined flow channel, before the second resin is supplied, or during a time starting after a time from the start of the second resin supply and ending with the termination of the supply, so that the velocity of main resin supply from the inner flow channel to the joined flow channel is reduced to a predetermined level by adjusting the degree of aperture for the outlet.

8 Claims, 13 Drawing Sheets

(51) Int. Cl.
  B29C 45/16 (2006.01)
  B29B 11/08 (2006.01)
  B65D 23/02 (2006.01)
  B29C 45/77 (2006.01)
  B29C 49/06 (2006.01)
  B29C 49/22 (2006.01)
  B29K 105/00 (2006.01)
  B29C 49/12 (2006.01)
  B29L 9/00 (2006.01)

(52) U.S. Cl.
  CPC .......... *B29C 45/1646* (2013.01); *B65D 23/02* (2013.01); *B29B 2911/141* (2013.01); *B29B 2911/1406* (2013.01); *B29B 2911/1408* (2013.01); *B29B 2911/1444* (2013.01); *B29B 2911/14066* (2013.01); *B29B 2911/14093* (2013.01); *B29B 2911/14466* (2013.01); *B29B 2911/14473* (2013.01); *B29C 45/77* (2013.01); *B29C 49/06* (2013.01); *B29C 49/12* (2013.01); *B29C 49/22* (2013.01); *B29C 2045/1648* (2013.01); *B29C 2945/76568* (2013.01); *B29C 2945/76755* (2013.01); *B29K 2105/258* (2013.01); *B29L 2009/00* (2013.01)

(56) References Cited

U.S. PATENT DOCUMENTS

| | | | |
|---|---|---|---|
| 4,512,730 | A | 4/1985 | Kudert et al. |
| 4,518,344 | A | 5/1985 | Latreille et al. |
| 4,526,821 | A | 7/1985 | McHenry et al. |
| 4,554,190 | A | 11/1985 | McHenry et al. |
| 4,712,990 | A | 12/1987 | Kudert et al. |
| 4,745,013 | A | 5/1988 | Kudert et al. |
| 4,751,035 | A | 6/1988 | McHenry et al. |
| 4,892,699 | A | 1/1990 | Kudert et al. |
| 4,895,504 | A | 1/1990 | Kudert et al. |
| 4,925,100 | A | 5/1990 | Kudert et al. |
| 4,931,246 | A | 6/1990 | Kudert et al. |
| 4,934,915 | A | 6/1990 | Kudert et al. |
| 4,946,365 | A | 8/1990 | Kudert et al. |
| 5,037,285 | A | 8/1991 | Kudert et al. |
| 5,523,045 | A | 6/1996 | Kudert et al. |
| 5,853,772 | A | 12/1998 | Kudert et al. |
| 5,968,558 | A | 10/1999 | Kudert et al. |
| 5,975,871 | A | 11/1999 | Kudert et al. |
| 6,095,785 | A | 8/2000 | Kudert et al. |
| 6,129,960 | A | 10/2000 | Kudert et al. |
| 6,194,041 | B1 | 2/2001 | McHenry et al. |
| 6,332,767 | B1 | 12/2001 | Kudert et al. |
| 6,440,350 | B1 | 8/2002 | Gellert et al. |
| 6,648,622 | B1 | 11/2003 | Gellert et al. |
| 6,655,945 | B1 | 12/2003 | Gellert et al. |
| 2003/0012845 | A1* | 1/2003 | Doyle ................ B29C 45/27 425/562 |
| 2008/0093772 | A1* | 4/2008 | Armstrong .......... B29C 45/1643 264/328.8 |
| 2013/0108834 | A1* | 5/2013 | Sweetland .......... B29C 45/1642 428/162 |

FOREIGN PATENT DOCUMENTS

| | | |
|---|---|---|
| JP | H05-253973 A | 10/1993 |
| JP | H06-122134 A | 5/1994 |
| JP | 2002-538994 A | 11/2002 |
| JP | 2004-330672 A | 11/2004 |
| JP | 2005-343099 A | 12/2005 |

OTHER PUBLICATIONS

Jan. 29, 2013 Written Opinion issued in International Patent Application No. PCT/JP2012/078662.

* cited by examiner

[Fig. 2]
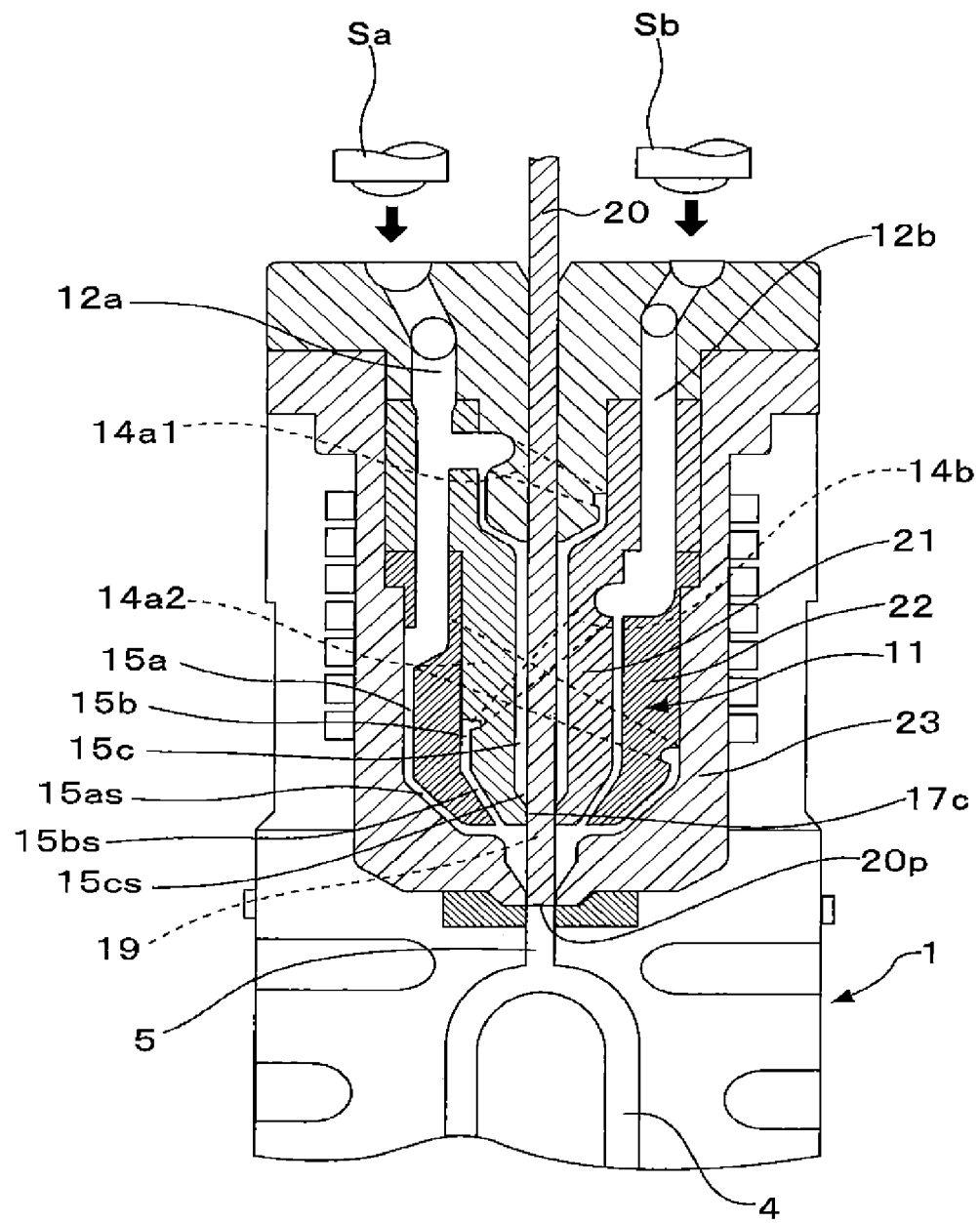

[Fig. 3]
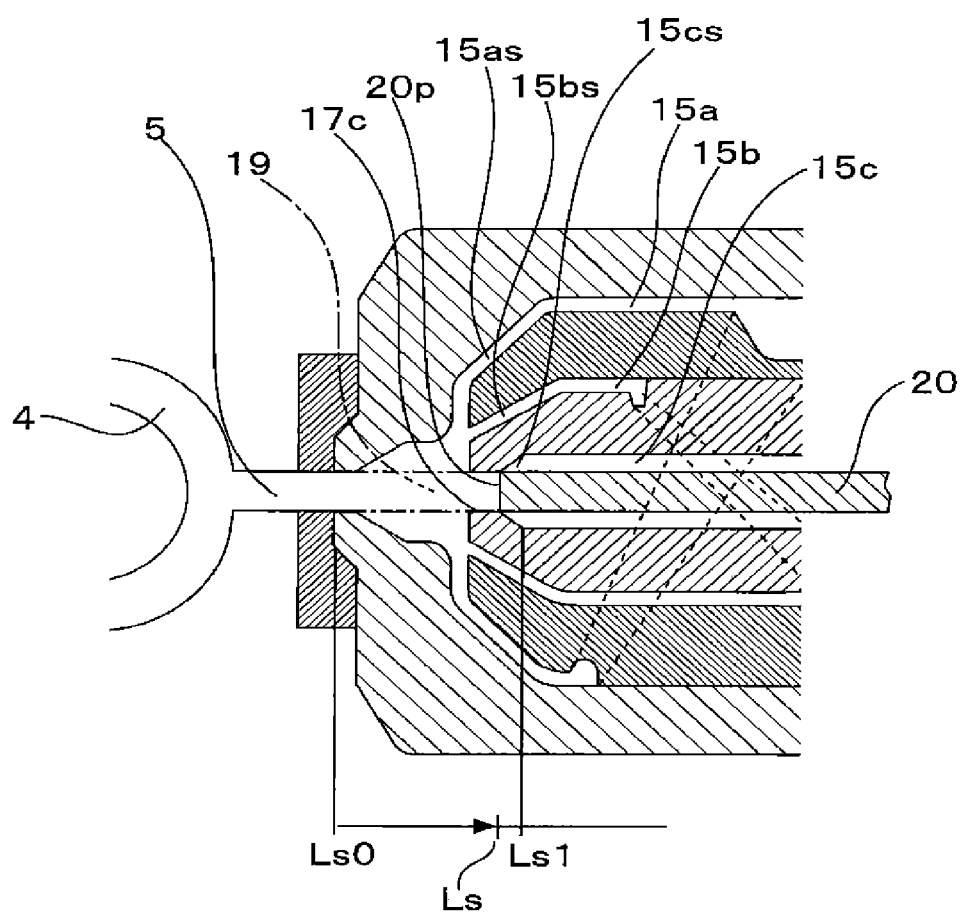

[Fig. 4]
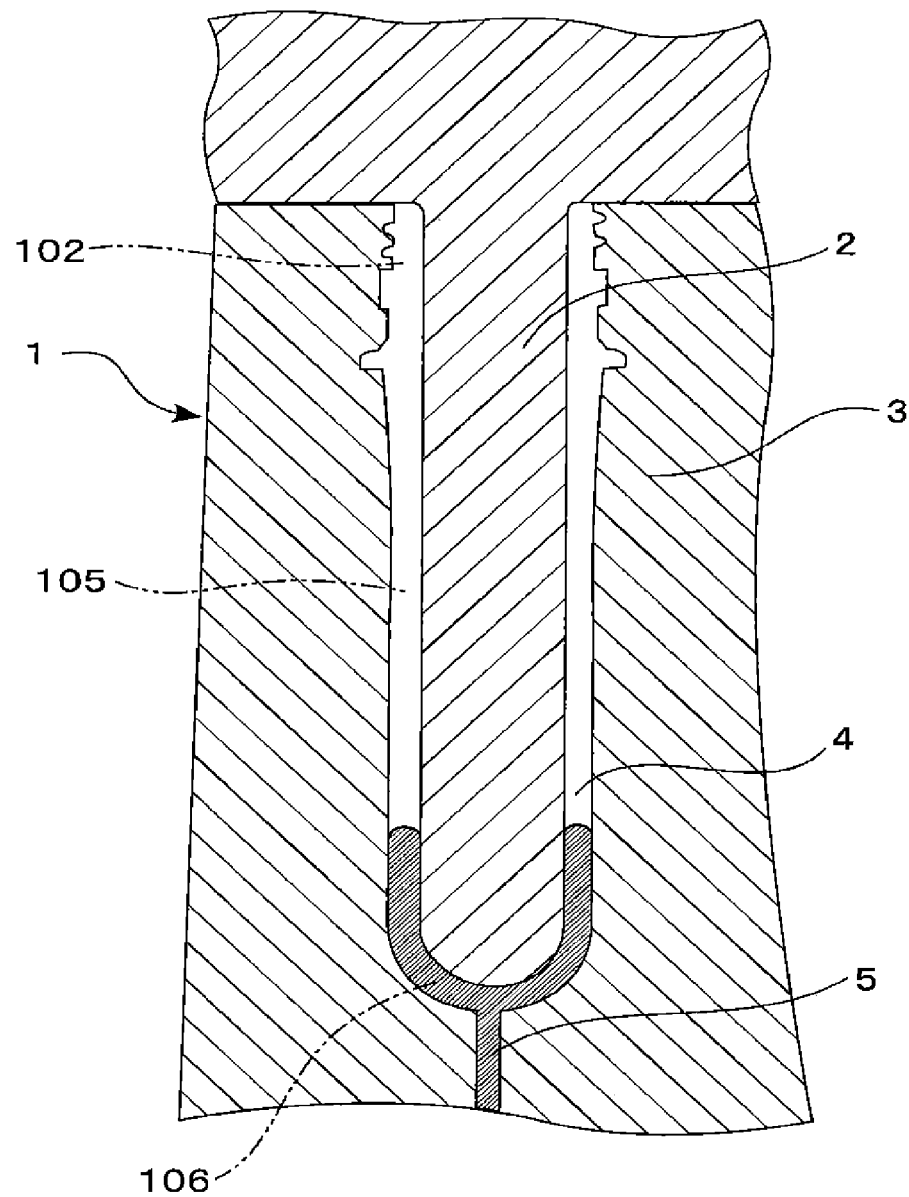

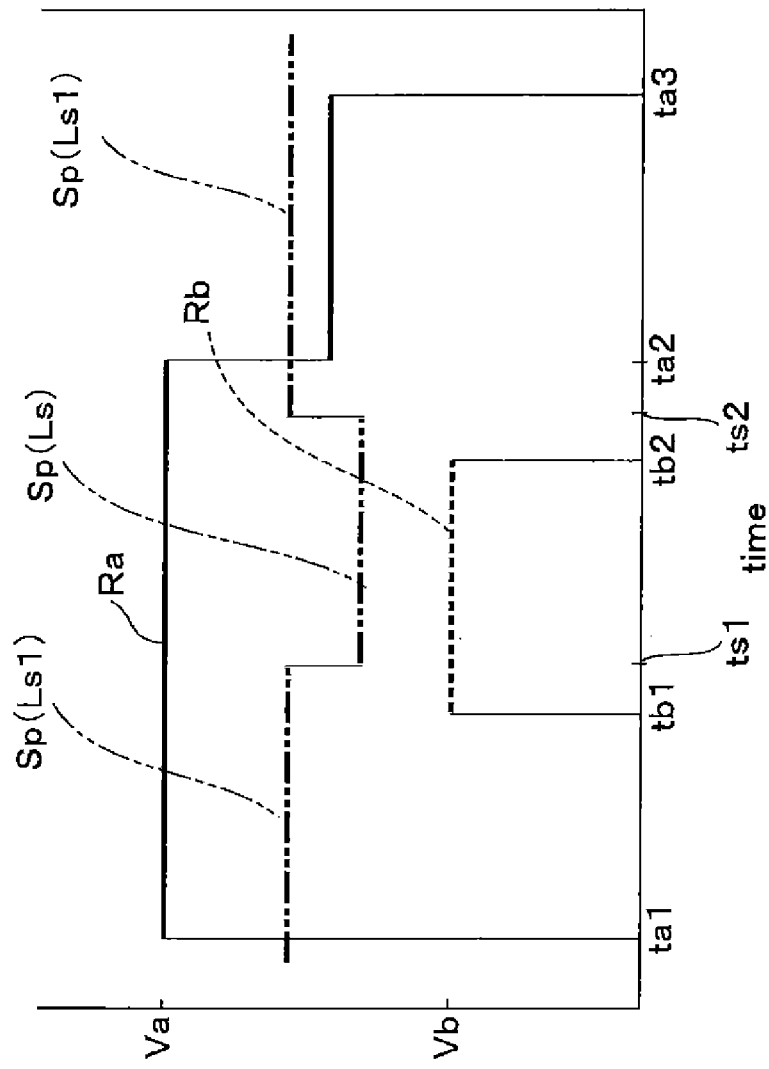
[Fig. 5]

[Fig. 8]

|  | Ls (mm) | La (mm) | Lb (mm) | OTR (cc/day) |
|---|---|---|---|---|
| Example 1 | 14.00 | 21.7 | – | 0.0026 |
| Example 2 | 14.55 | 19.3 | 5.0 | 0.0028 |
| Example 3 | 14.60 | 18.5 | 11.5 | 0.0075 |
| Example 4 | 15.10 | – | 15.9 | – |
| Example 5 | 18.00 | 17.6 | 19.4 | 0.0236 |

[Fig. 9]
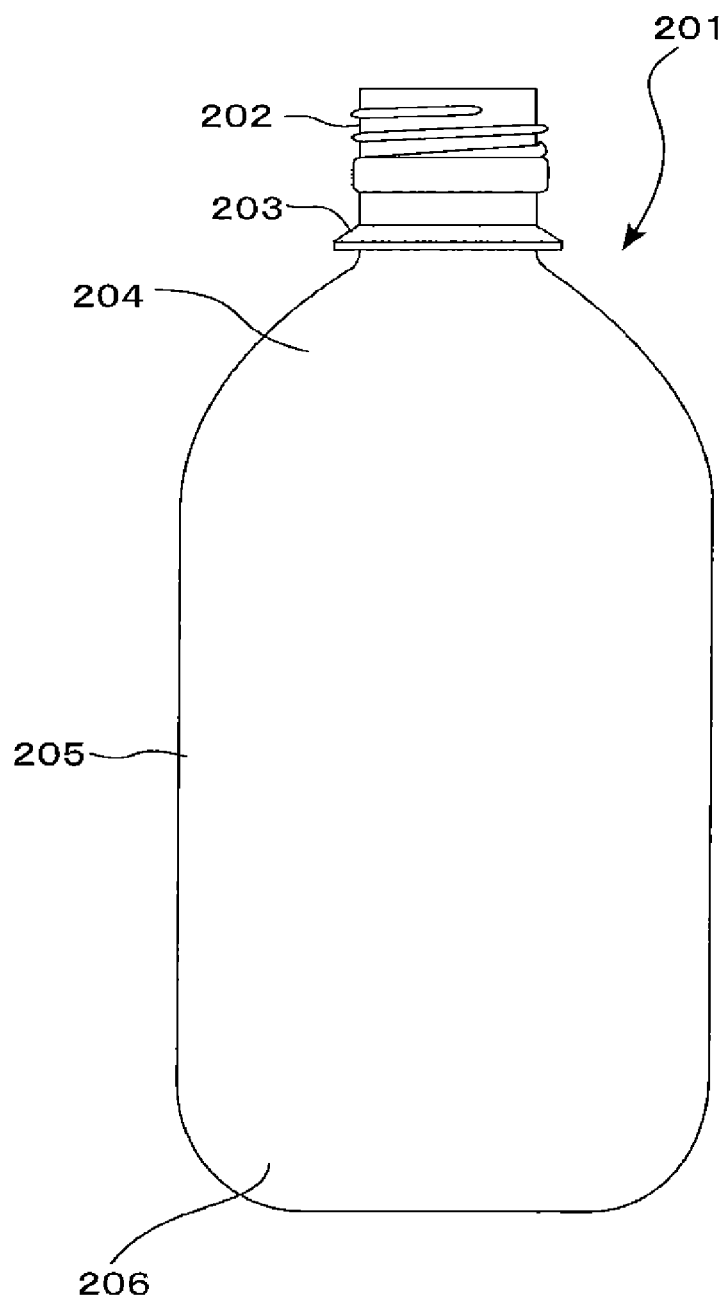

[Fig. 11]
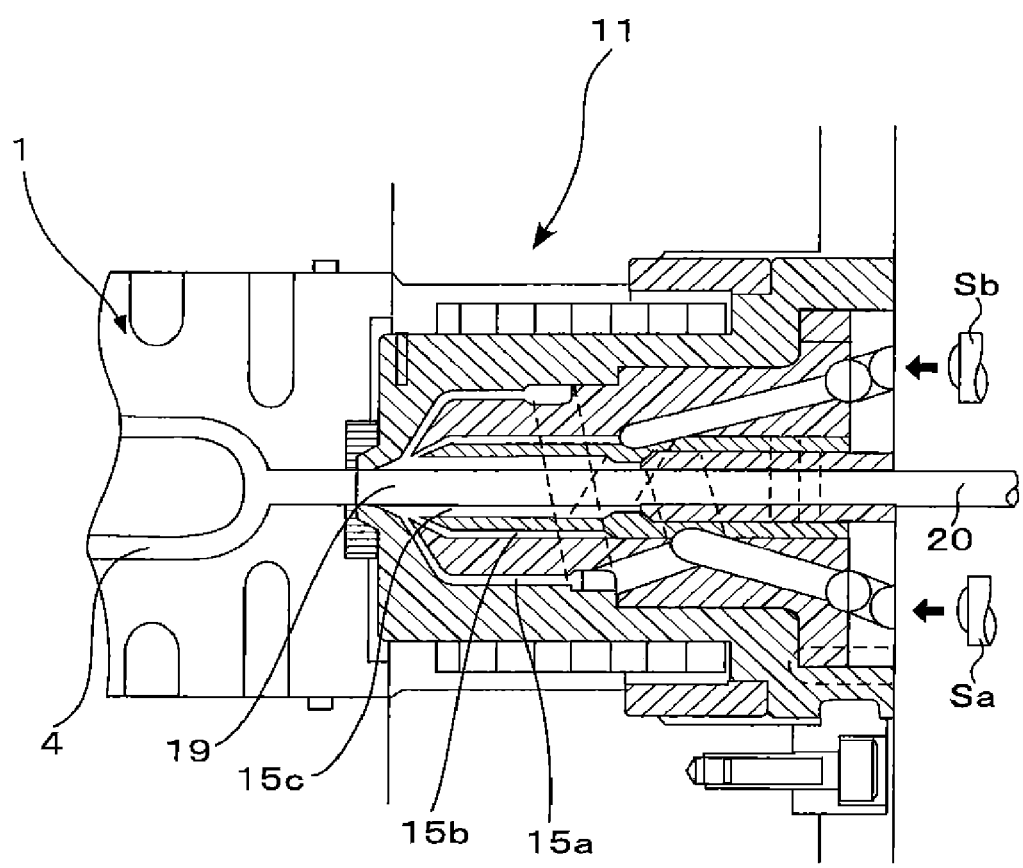

[Fig. 12]
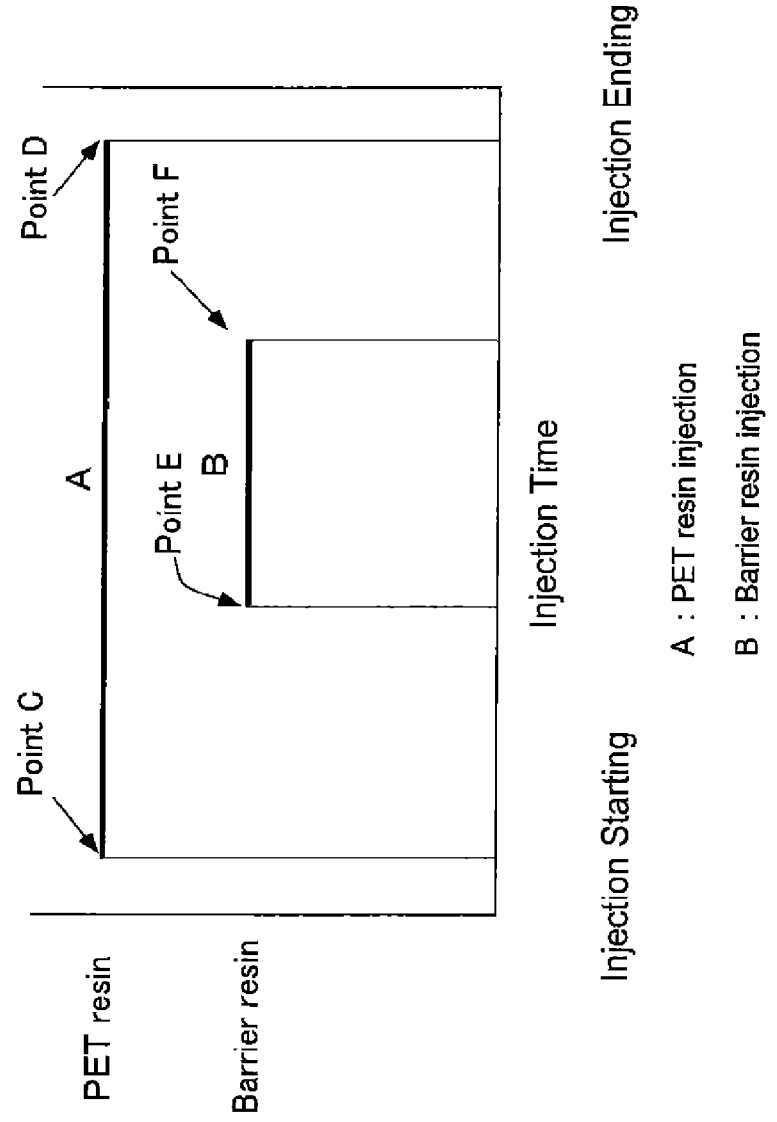

State right before point E

State between point E and point F

State at the point F

US 10,723,093 B2

PREFORM EXTRUSION MOLDING APPARATUS, METHOD FOR EXTRUSION MOLDING, AND PREFORM

This application is a divisional application of application Ser. No. 14/359,154 filed May 19, 2014, which in turn is a U.S. national stage application of PCT/JP2012/078662 filed Nov. 6, 2012. The disclosures of those prior applications are incorporated herein by reference.

TECHNICAL FIELD

This invention relates to a device and a process for injection molding a preform in a test tube shape for use in the biaxial stretching and blow molding of a synthetic resin bottle having an intermediate layer laminated with main-resin layers that make up a shape of the preform, and to the preform made by these device and process.

BACKGROUND ART

Polyethylene terephthalate resin bottles (PET bottles), obtained by biaxially stretching and blow molding an injection molded preform in a test tube shape, have high transparency, high mechanical strength, and a high gas barrier property, and find their way into various fields such as beverages, foods, and cosmetics. There are many cases where the quality of a content fluid has to be prevented from decreasing, and there are use applications especially requiring a gas barrier property against oxygen and other gases. In such cases, a 2-resin/3-layer laminar structure is used for the bottle in which an intermediate layer made of, e.g., a nylon resin having a high gas barrier property is laminated with the main-resin layers of a PET resin that makes up the shape of the preform. The PET bottle having a laminar structure of this type can be molded by biaxially stretching and blow molding a preform having a test tube shape and a 2-resin/3-layer laminar structure.

Patent document 1 describes an invention associated with a molding device having a multi-layer nozzle for injection molding a 2-resin/3-layer preform such as described above. As an example, FIG. 10A shows a prior-art preform 101 of this type. FIG. 11 is a schematic vertical section of a nozzle section 11 in a device for molding the preform 101. FIG. 12 is an explanatory diagram showing an example of the injection pattern used with this molding device to mold the preform 101. FIG. 13 is an explanatory diagram showing the filling steps in which the mold cavity is filled with molten resins.

The preform 101 in FIG. 10A has a gas barrier resin layer 101b made of a resin having a high gas barrier property as an intermediate layer and laminated with the main-resin layers. This preform 101 is biaxially stretched and blow molded into a bottle having a function that is difficult for a single PET resin to achieve, for example, a function of controlling the oxidative degradation of the content by minimizing the volume of outside oxygen that penetrates the bottle. Such a bottle can be made from the preform 101.

The preform 101 having such a laminar structure is molded by using an injection pattern shown in FIG. 12 and a molding device having a multi-layer nozzle section 11 shown in FIG. 11. Now referring to the device of FIG. 11, a PET resin supplied from a first feeder Sa passes through an outer flow channel 15a and an inner flow channel 15c, and flows into a joined flow channel 19. A barrier resin supplied from a second feeder Sb passes through a middle flow channel 15b and enters the joined flow channel 19. At that time, the barrier resin Rb is put between the outer flow channel 15a and the inner flow channel 15c. Inside the joined flow channel 19, a joined resin fluid is formed in which the barrier resin Rb is laminated with the main resin Ra in a cylindrical shape. This joined resin fluid is then injected into a cavity 4 of a mold 1 to fill the cavity.

An example of injection molding is described, now referring to FIGS. 12 and 13. FIG. 13A shows a state right before point E in the injection pattern shown in FIG. 12. In this state, it is found that only the PET resin Ra have been filled. At point E, the injection of the barrier resin Rb is started. Between point E and point F, the barrier resin Rb is sandwiched between layers of the PET resin Ra, and is sent to the mold cavity in that laminated state (See FIG. 13B. At point F, the injection of the barrier resin is terminated, and from then on, the cavity is filled only with the PET resin Ra until the end of the injection step (See FIG. 13C). Thus, the preform 101 shown in FIG. 10A can be obtained.

PRIOR ART REFERENCES PATENT DOCUMENT

Patent document 1: Japan patent application publication No. 2004-330672

SUMMARY OF THE INVENTION

Problems to be Solved by the Invention

As can be seen from FIG. 10A, an entire peripheral wall of the preform 101 thus molded is not necessarily laminated with the barrier resin layer 101b, but in many cases, the barrier resin layer 101b is not laminated in an upper portion of the neck 102 and in the bottom 106 of the preform 101.

In the case of the neck 102 which is an open end, the barrier layer 101b should not be laminated in the upper portion of the neck 102 because of a problem of deformation. If the barrier layer 101b made of a different resin were extended to the upper end, the cylindrical neck 102 would deform into an elliptical shape at the time of molding shrinkage or thermal crystallization treatment of the neck 102. In the example of the preform 101 shown in FIG. 10A, the leading edge, LE, of the barrier resin layer 101b is located at a nearly middle height of the neck 102, because of the consideration for the above-described deformation, gas barrier property, and in addition, the material cost of the barrier resin. Thus, a high degree of accuracy is required to control the position of the leading edge, LE, of the barrier resin layer 101b. But the neck 102 is a portion having a relatively thick wall, and does not deform after the preform 101 has been biaxially stretched and blow molded into the bottle. Even if a limited area of the upper portion of the neck 102 is made of only the PET resin layer 101a, any decrease in the gas barrier property of the entire bottle can be restricted to a relatively low level.

Unlike the neck 102, the bottom 106 is a portion which is stretched to a thin wall. From a point of view of preventing the decrease in the gas barrier property of the entire bottle, it seems preferable to cover the entire bottom 106 with the barrier resin layer 101b, as shown in FIG. 10B. However, it is necessary for the flow of the barrier resin into the cavity 4 to be cut instantaneously at point F in the injection pattern of FIG. 12, i.e., at the end of injection of the barrier resin. If this fails, the lamination would fall in a blunt-edged state, in which more than one barrier resin layer 101b may be laminated in the bottom 106, or fractions of the barrier resin layer 101b, or the so-called scales, may exist in the bottom 106. Because of such a non-uniform state of the barrier resin layer, the bottom of the bottle, when molded, may deform irregularly to give an unstable ground contact. Another problem is that the mechanical strength of the bottle may fall to a low level. Still another problem is that a fraction of the barrier resin Rb may stay behind in an open end portion of the multi-layer nozzle section 11. This fraction would mix in the PET resin Ra in the next shot.

According to a molding process that enables the bottom to be encapsulated, it is possible for the barrier resin layer 101b to form a continuously laminated wall without segmenting the bottom 106, as shown in FIG. 10B. But still problems remain, as vestige of the gate located at the center of the bottom 106 of the preform is unstable in size, causing unstable moldability. Furthermore, the stretching rod may run through the inner PET resin layer 101a on the inner side at the time when the preform is vertically stretched, thus giving damage to the bottle.

This invention has been made to solve the problems found in prior-art techniques associated with the injection molding of preform in which a second resin layer is laminated with, and embedded in, the above-described main-resin layers. Thus, a technical problem of this invention is to control the behavior of the intermediate layer in the lamination of the preform bottom so as to achieve the biaxial stretching and molding at high productivity and to offer a bottle having a high gas barrier property given by the intermediate layer.

Means of Solving the Problems

This invention relates to a device for injection molding a preform, an injection molding process using this device, and a preform that can be molded by this injection molding process. Descriptions will be made below in an order of the injection molding device, the injection molding process, and the preform. A main feature associated with the injection molding device of this invention is a device for injection molding a preform in a test tube shape for use in biaxial stretching and blow molding, in which preform a second-resin layer serving as an intermediate layer is laminated with layers of a main resin that makes up the shape of the preform, the device having a nozzle section for forming a joined resin fluid by allowing a second resin for forming the second-resin layer to join a main resin for forming the main-resin layers, and having a mold disposed ahead of the nozzle section, said nozzle section comprising:

three cylindrical layer-forming flow channels including an outer flow channel, a middle flow channel, and an inner flow channel in an outside-to-inside order, and a joined flow channel connected to these three flow channels and extended to a head of the nozzle section, wherein the main resin is passed through the outer and inner flow channels, and the second resin is passed through the middle flow channel, and a rod-like shut-off pin disposed on an inner side of the inner flow channel and slidably inserted therein, wherein an outlet of the inner flow channel, which is open to the joined flow channel, is shut off or opened, and a degree of aperture can be adjusted, by controlling the position of a forefront of the shut-off pin.

Another feature of this invention is that in the above-described main feature, the device comprises a first resin feeder for feeding the main resin and a second resin feeder for feeding the second resin, the nozzle section comprising in an outside-to-inside order the three flow channels including the outer flow channel, the middle flow channel, and the inner flow channel, and a cylindrical joined flow channel connected to the three flow channels and extended to the head of the nozzle section, wherein the main resin from the first feeder is sent to both the outer and inner flow channels, and the second resin from the second feeder is sent to the middle flow channel, and wherein the two resins are joined together in a cylindrical shape to form a joined resin fluid in joint flow channel, which fills a cavity by being injected into the cavity by way of a pin gate disposed at a position of the cavity of the mold corresponding to the center of a bottom wall of the preform.

According to the injection molding device having the above-described features, the cylindrical shut-off pin is slidably inserted inside the inner flow channel, so that the position of the forefront of this shut-off pin can be controlled to shut off or open the outlet of the inner flow channel, which is open to the joined flow channel, and to adjust the degree of aperture to be opened. Because of this shut-off pin forefront position control, the resin supplies from the outer, middle, and inner flow channels to the joined flow channel can be controlled in the following manner, while continuing the resin supplies from the first and second feeders:

1) When the inner flow channel is fully opened by locating the forefront upstream of the outlet of the inner flow channel which is open to the joined flow channel, the second resin supplied from the middle flow channel is sandwiched between the main-resin layers coming from both the outer flow channel and the inner flow channel, and this takes place in the joined flow channel so that the joined resin fluid thus formed in the joined flow channel would have the second resin laminated cylindrically with the columnar main resin.

2) When the forefront is located at a predetermined position near the outlet of the inner flow channel to decrease the degree to which the outlet is opened and to slow down the speed of the main resin supply from the inner flow channel, the second resin in a columnar main resin would have a layer width less than in the case of 1).

3) When the forefront is located downstream of the outlet of the inner flow channel, in order to shut off the inner flow channel completely, the second resin supplied through the middle flow channel joins with the main resin coming only from the outer flow channel because the supply of the main resin from the inner flow channel is completely shut off. In that case, the joined resin fluid formed in the joined flow channel consists mainly of the main resin with the second resin being laminated in a thin-wall cylindrical shape.

As described above in 2), it is possible for the second-resin layer inside the main resin of the joined resin fluid to be controlled with a high degree of accuracy so that the second-resin layer would have a predetermined diameter in the cylindrical shape. Especially, at the bottom of the preform, the intermediate layer can be laminated with a high degree of accuracy which has been difficult in the prior art.

Since the above described feature is based on a simple mechanism of linear sliding movement of the shut-off pin, the degree of aperture to be opened can be adjusted for the inner flow channel with predetermined timing by means of high-accuracy positioning.

Still another feature associated with the injection molding device of this invention is that in the above-described features, the inner flow channel has a diameter-reduced flow channel in an end portion, where the diameter is reduced in a tapered manner to a level adequate for the joined flow channel.

According to the above-described feature, the degree of aperture, to which the inner flow channel is shut off or opened, can be adjusted for the outlet of the inner flow channel with high accuracy by the forefront of the shut-off pin which makes effective use of the diameter-reduced flow channel.

Still another feature associated with the injection molding device of this invention is that in the main feature described above, the sliding movement of the shut-off pin is controlled by a servomechanism.

According to the feature described above, the inner flow channel can be shut off or opened with predetermined timing, and furthermore, the position at which the forefront of the shut-off pin is located, can be controlled with high accuracy, by using the servomechanism to control the sliding movement of the shut-off pin. Thus, the degree of aperture, to which the inner flow channel is shut off or opened, can be adjusted with high accuracy by the forefront of the shut-off pin.

A main feature associated with the process for injection molding a preform according to this invention is a process for injection molding a preform for use in the biaxial stretching and blow molding, which preform has a test tube shape and has a second-resin layer laminated with main-resin layers made of a main resin that makes up the shape of the preform. The injection molding process of this invention comprises the steps of:

a) using the above-described injection molding device of this invention;

b) supplying a main resin from an outer flow channel and an inner flow channel to a joined flow channel at a predetermined supply velocity for a predetermined period of time;

c) supplying a second resin from a middle flow channel to the joined flow channel simultaneously with the main resin at a predetermined supply velocity for a certain period of time within the predetermined period of time; and d) sliding the shut-off pin to bring the pin forefront to a predetermined position near an outlet of the inner flow channel, which is open to the joined flow channel, previously before the second resin is supplied, or during a period of time starting after a predetermined time from the start of second-resin supply and ending with the termination of the supply, so that the velocity of main resin supply from the inner flow channel to the joined flow channel is reduced to a predetermined level by adjusting the degree of aperture for the outlet end.

Another feature associated with the process of this invention for injection molding a preform is that in the main feature described above, the process comprises the steps of:

a) at first, keeping the outlet of the inner flow channel at a fully open state by means of the control of a sliding position of the shut-off pin, and supplying the joined flow channel with the main resin from the first feeder by way of the outer and inner flow channels;

b) supplying the second resin from the second feeder to the joined flow channel from the inner flow channel by way of the middle flow channel for a certain period of time at a predetermined time after the start of main resin supply, and allowing the second-resin layer to be sandwiched between the main-resin layers coming from the outer flow channel and the inner flow channel;

c) bringing the forefront of the shut-off pin to a predetermined position near the outlet of the inner flow channel, which is opened to the joined flow channel, in a predetermined time after the start of the main resin supply from the inner flow channel, so as to decrease the velocity of the main resin supply from the inner flow channel; and d) then, in a predetermined time after the end of the main resin supply from the inner flow channel, sliding the shut-off pin to keep the inner flow channel pressured in a fully open state for a predetermined time.

Still another feature associated with the process of this invention for injection molding a preform is that in the main feature described above, the process also comprises:

a) joining the main resin and the second resin in the joined flow channel to form a joined resin fluid, and injecting the joined resin fluid into the mold cavity by way of a pin gate disposed at a position of the mold cavity corresponding to the center of a bottom wall of the preform in order to fill the cavity with the fluid; and b) setting an injection pattern, including a speed of the main resin supply, a starting time, an ending time, and a speed of the second-resin supply, a moment of sliding the shut-off pin, and the positioning of the forefront of the pin, associated with a degree of aperture to be opened or closed at the outlet of the inner flow channel, and thereby, positioning a trailing edge of the second-resin layer within a predetermined range in the bottom, while excluding the gate vestige to be formed at the center of the bottom, which is molded in a semi-spherical shell shape when the second-resin layer is laminated with main-resin layers to form a preform.

According to the above-described molding process of this invention, a joined columnar resin fluid is formed in a sequential manner in the joined flow channel in process steps described below.

(1) The main resin from the outer flow channel joins the main resin from the inner flow channel in the joined flow channel to form a joined columnar resin fluid comprising only the main resin.

(2) Then, the second resin from the middle flow channel flows between the main resin from the outer flow channel and the main resin from the inner flow channel to form a joined resin fluid in which the cylindrical layer of the second resin has been sandwiched between the two columnar layers of the main resin.

(3) At this point, the degree of aperture for the outlet of the inner flow channel is adjusted by the forefront of the shut-off pin to reduce the speed of main-resin supply from the inner flow channel so that the joined resin fluid is formed in such a way that the second resin would have a thin, cylindrical shape and a predetermined diameter.

(4) Lastly, with the termination of the second-resin supply from the middle flow channel, the main resin from the outer flow channel joins the main resin from the inner flow channel to form again the columnar joined resin fluid made of the main resin.

The step (3) described above is a step for controlling in a sophisticated manner the behavior of lamination that forms the second-resin layer near the bottom of the preform. According to the molding process described above, the second resin can maintain a cylindrical laminar shape as far as the trailing edge, because the main-resin supply from the inner flow channel continues, even in a small amount, until the second-resin supply terminates. This continued supply of the main resin serves to prevent encapsulation in which a continuous laminate pattern is formed in the entire bottom region including a gate vestige. The cylindrical laminate shape of the second resin can eliminate the problem of insufficient moldability caused by encapsulation and the problem of deformed bottom of the bottle.

In addition, the adjustment of aperture for the outlet of the inner flow channel also enables the second resin to have a cylindrical laminate shape and a predetermined diameter, at least, at or near the trailing end. Thus, when the intermediate layer of the second resin is laminated with the main-resin layers, it becomes possible to have highly sophisticated control over the lamination pattern, which involves setting the trailing edge of the second-resin layer at a position in a predetermined range near the bottom of the preform, while excluding a circular pin gate vestige formed at the center of the bottom wall plate.

The main feature of the molding process described above has the following description: "previously before the second resin is supplied, or during a period of time starting after a predetermined time from the start of the second-resin supply and ending with the termination of the supply." As understood from this description, the timing of adjusting the degree of aperture for the outlet of the inner flow channel by means of the forefront of the shut-off pin can before the starting time of the second-resin supply or during the period of supply. As described above, in order for the highly sophisticated control over the lamination pattern for the second-resin layer at a position near the bottom of the preform, it is necessary to maintain a lamination pattern in which the second-resin layer inside the joined resin fluid is in a slim, cylindrical shape at or near the trailing edge of the second-resin layer. It is also necessary to adjust the degree of aperture for the outlet of the inner flow channel at least until the supply of the second-resin layer comes to an end.

Still another feature of the injection molding process of this invention is that in the main feature described above, a synthetic resin having a high gas barrier property is used as the second resin so that the second-resin layer is effective as a gas barrier layer.

A main feature associated with the preform of this invention is a test-tube-like preform for biaxial stretching and blow molding use, in which an intermediate layer of a second resin laminated with the main-resin layers that make up the shape of the preform. The preform is characterize in that the trailing edge of the second-resin layer is located in the bottom within a range covering from outside of an outer peripheral edge of a circular gate vestige formed in the center of a bottom plate of a bottom to a peripheral edge of a corresponding inner peripheral surface of a body.

It has been difficult for the conventional molding technology to achieve such a lamination pattern for the second-resin layer near the bottom, but it becomes possible to achieve by means of the injection molding process of this invention. When the trailing edge of the second-resin layer is located in a limited range in the bottom except for the gate vestige, the second-resin layer can fully perform the function of gas barrier and the like, while resolving the problems of bad moldability or deformation in the bottom of the bottle, such as Effects of the Invention According to the injection molding process using the injection molding device of this invention, the adjustment of aperture for the outlet of the inner flow channel also enables the second resin to have a cylindrical laminate pattern having a predetermined diameter, at least, at or near the trailing end. In addition, it becomes possible to have highly sophisticated control over the laminate pattern, which involves setting the trailing edge of the second-resin layer at a position in a predetermined range near the bottom of the preform, while excluding a circular pin gate vestige formed at the center of the bottom wall plate. The second-resin layer at such a position can fully perform the gas barrier function and the like, while resolving the problem of bad moldability or the problem of deformation in the bottom of the bottle, which is caused by covering the gate vestige with the second-resin layer.

BRIEF DESCRIPTION OF THE DRAWINGS

FIG. 2 is a schematic explanatory diagram showing a vertical section of an important part of the injection molding device of this invention in an embodiment.

FIG. 3 is an explanatory diagram showing a position of movement of the shut-off pin inside the device of FIG. 2.

FIG. 4 is a vertical section showing an outline structure of the mold.

FIG. 5 is an explanatory diagram showing an example of the injection pattern used in the injection molding process of this invention.

FIG. 8 is a table showing compiled results of measurements for the positions of trailing edge of the second-resin layer in 5 examples of positions to which the forefront of the shut-off pin has moved.

FIG. 9 is a front view of a bottle biaxially stretched and blow molded from the preform of FIG. 1.

FIG. 11 is a cross-sectional view schematically showing an example of a conventional multi-nozzle section.

FIG. 12 is an explanatory diagram showing an example of the injection pattern for molding the preform of FIG. 10A.

MODES FOR CARRYING OUT THE INVENTION

Figure 1A:
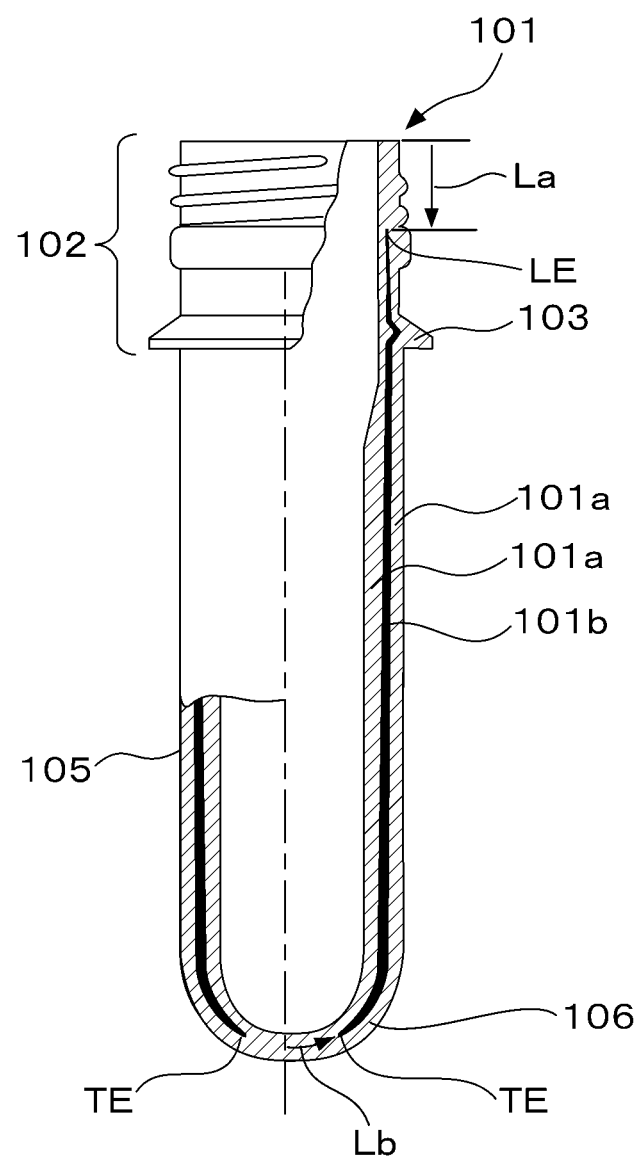
FIG. 1A is a front view, with a partially taken vertical section.
Figure 1B:
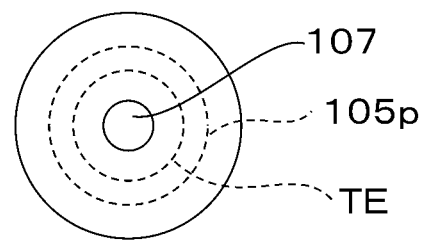
FIG. 1B is a bottom view, respectively, of the preform of this invention.

The preform, the injection molding device, and the injection molding process of this invention will be described below with respect to preferred embodiments, now referring to the drawings, in which FIG. 1 shows an embodiment of the preform 101 of this invention molded by the later described injection molding process of this invention. The preform generally has a test tube shape and a laminar structure in which a barrier resin layer 101$b$, i.e., an intermediate layer made of a second resin, is laminated with PET resin layers 101$a$, i.e., the main-resin layers that occupy a major portion of the preform. In this embodiment, MXD6 nylon is used as the barrier resin. The preform 101 has a total height of 100 mm. A body 105 has an outer diameter of 20 mm and an average wall thickness of 2.5 mm. The preform weighs 22 g. A circular gate vestige 107, with a diameter of 5 mm, remains at the center of the outer peripheral surface of the bottom 106 (See FIG. 1B).

The leading edge, LE, of the barrier resin layer 101$b$ is located at a length, La, of 19.3 mm, which is a distance from the top surface of the neck 102. The trailing edge, TE, of the barrier resin layer 101$b$ is located at a length, Lb, of 5 mm, which is a distance from the center of the bottom plate of the bottom 106, i.e., located peripherally at about 2.5 mm outside of the outer peripheral edge of the gate vestige 107. As seen in the bottom view of FIG. 1B, it is found that the trailing edge, TE, is located in a range covering from outside of an outer peripheral edge of the circular gate vestige 107 formed at the center of the bottom plate of the bottom 106 to a lower end of an inner peripheral surface 105p of the body 105. Both lengths La and Lb are average values.

FIGS. 2, 3, and 4 schematically show an example of the injection molding device of this invention, in which FIG. 2 is a vertical section of a nozzle section 11 and its vicinity, with a mold 1 being fitted on the downstream side; FIG. 3, an explanatory diagram explaining a position of the forefront 20p of the shut-off pin 20 in the device of FIG. 2; and FIG. 4, a vertical section schematically showing a structure of the mold 1.

This nozzle section 11 has a first mandrel 21, a second mandrel 22, and a third mandrel 23, which are all cylindrical and are disposed concentrically in an order from inside to outside. A shut-off pin 20 in a rod shape is disposed inside of the first mandrel 21 in a slidably inserted manner. The fore-end of each mandrel has a tapered portion, the diameter of which is reduced toward the downstream. A main resin Ra flows through a cylindrical outer flow channel 15a, which is formed between the third mandrel 23 and the second mandrel 22. A second resin Rb flows through a cylindrical middle flow channel 15b, which is formed between the second mandrel 22 and the first mandrel 21. In addition, the main resin Ra also flows not only through the outer flow channel 15a but also through a cylindrical inner flow channel 15c, which is formed between the first mandrel 21 and the shut-off pin 20.

The main resin Ra is supplied from a first feeder Sa, which comprises an extruder of a screw type or an accumulator having a plunger fitted to the tip of the extruder, passes through a guide channel 12a and flows through an outer flow channel 15a and an inner flow channel 15c by way of manifold 14a1 and 14a2, respectively. The second resin Rb is supplied from a second feeder Sb, passes through a guide channel 12b and flows through a middle flow channel 15b by way of manifold 14b.

Then, the main resin Ra enters a diameter-reduced flow channel 15 as disposed in an end portion of the outer flow channel 15a. The main resin Ra also enters a diameter-reduced flow channel 15cs disposed at the end of the inner flow channel 15c. The second resin Rb enters a diameter-reduced flow channel 15bs disposed in an end portion of the middle flow channel 15b. All these resins enter a joined flow channel 19 where the main resin Ra and the second resin Rb join together to form a joined resin fluid. This joined resin fluid is passed through a pin gate 5 disposed at a position corresponding to a center of a bottom plate of the bottom 106 of the preform 101, and is injected into a cavity 4 to fill this cavity 4, which is formed by a core mold 2 and a cavity mold 3 of a mold 1.

In the device of this invention, the shut-off pin 20 forms the inner flow channel 15c together with the first mandrel 21, and is allowed to slide through the inner peripheral surface in a diameter-reduced head portion of the first mandrel 21. This shut-off pin 20 performs an ordinary function of shutting off or opening the head portion of the nozzle section 11. In addition, when the forefront 20p of the pin 20 is controlled to take a predetermined position near an outlet 17c of the inner flow channel 15c that is open to the joined flow channel 19, the pin 20 can adjust the degree of aperture of this outlet 17c between a full open state and a shut-off state so as to adjust the amount of the main resin Ra to be supplied from the inner flow channel 15c to the joined flow channel 19. The sliding movement of the shut-off pin 20 (in the vertical direction in FIG. 2) is controlled by a servo-mechanism (not shown) utilizing a servomotor, to ensure that the highly sophisticated flow-adjusting function described above can be performed.

As described above, the shut-off pin 20 adjusts the speed of the main resin Ra supplied from the inner flow channel 15c, and since this adjustment is carried out at the outlet 17c of the inner flow channel 15c, i.e., a point of contact with the joined flow channel 19, any delayed time caused by the visco-elastic quality of molten resins can be avoided, and the supply and shut-off of resins and the flow rate adjustment can be controlled in a high degree of accuracy, as compared to a conventional flow-adjusting function using a check valve or a spool valve disposed at a position remote from the joined flow channel 19 on the upstream side of the nozzle section 11.

FIG. 3 is a diagram for explaining the position of the forefront 20p of the shut-off pin 20 in the device of FIG. 2. In FIG. 3, a given position, Ls, of the forefront 20p is expressed as a length from position Ls0 in the end portion of the nozzle section 11. Position Ls1 is a position corresponding to an upstream end of the diameter-reduced flow channel 15cs. For the device of this embodiment, Ls1 is 18 mm from the position Ls0

An example of the injection molding process of this invention will be described below. FIG. 5 is a schematic explanatory diagram showing an injection pattern used when the preform 101 shown in FIG. 1 is injection molded by using the injection molding device of FIG. 2. This pattern is depicted using a lateral axis as a time axis and a vertical axis as speeds of molten resin supplies. The solid line shows the injection pattern for the PET resin Ra, which is the main resin, and the dotted line shows that of the barrier resin Rb. The PET resin Ra is supplied from the first feeder Sa at a supply velocity of 7.1 g/sec. The barrier resin is supplied from the second feeder Sb at a supply velocity Vb of 0.53 g/sec.

Along with the above-described injection pattern, FIG. 5 also shows the position of the forefront 20p of the shut-off pin 20 found over time by a two-dot chain line. In a time zone of Sp (Ls1), the forefront 20p is located at Ls1, i.e., 18 mm; and in a time zone of Sp (Ls), the forefront 20p is located at 14.55 mm in the case of this embodiment. The flow rate is controlled by narrowing down the degree of aperture at the outlet 17c of the inner flow rate 15c so that the supply of the PET resin Ra would be reduced. As regards the time axis, the injection starting time ta1 for the PET resin Ra is used as a benchmark. The injection ending time ta2 for the PET resin Ra is 4.5 sec. For the barrier resin Rb, the injection starting time tb1 is 1.6 sec, and the ending time tb2 is 3.4 sec. The forefront 20p of the shut-off pin 20 is located at the position of 14.55 mm for a period ranging from time ts1 (2.1 sec) to ts2 (3.9 sec).

The injection molding steps over time in the injection pattern of FIG. 5 are as follows:

(1) Set the forefront 20p of the shut-off pin 20 at the position of Ls1 (See FIG. 3) to fully open the outlet 17c of the inner flow channel 15c, and supply the PET resin Ra from the first feeder Sa to the joined flow channel 19 by way of the outer flow channel 15a and the inner flow channel 15c.

(2) Supply the barrier resin Rb from the second feeder Sb to the joined flow channel 19 at time tb1 by way of the middle flow channel 15b, and flow the barrier resin Rb between the PET resin Ra from the outer flow channel 15a and the PET resin Ra from the inner flow channel 15c.

(3) At time ts1, reduce the supply speed for the PET resin Ra sent through the inner flow channel 15c, where the forefront 20p of the shut-off pin 20 takes the position Ls (See FIG. 3).

(4) Terminate the supply of the barrier resin Rb from the second feeder Sb at time tb2.

(5) Bring the forefront 20p of the shut-off pin 20 back to the position Ls1 at time ts2 to allow the speed of the supply of the PET resin Ra coming from the inner flow channel 15c to return to the original speed.

(6) Reduce the mold pressure to a predetermined level at time ta2 (resulting in a decrease in the speed of supply from the first feeder Sa), and keep the pressure at that level till time ta3.

Figure 6A:
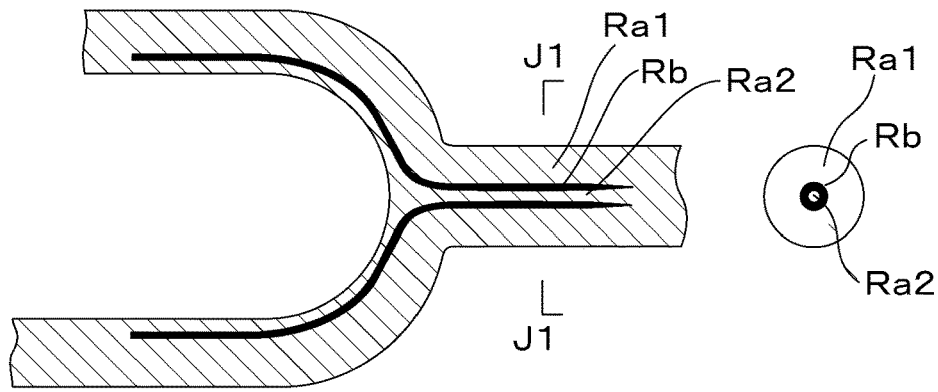
FIGS. 6A-6C are each a schematic explanatory diagram showing steps of filling the mold cavity with molten resins using the injection pattern of FIG. 5.
Figure 6B:
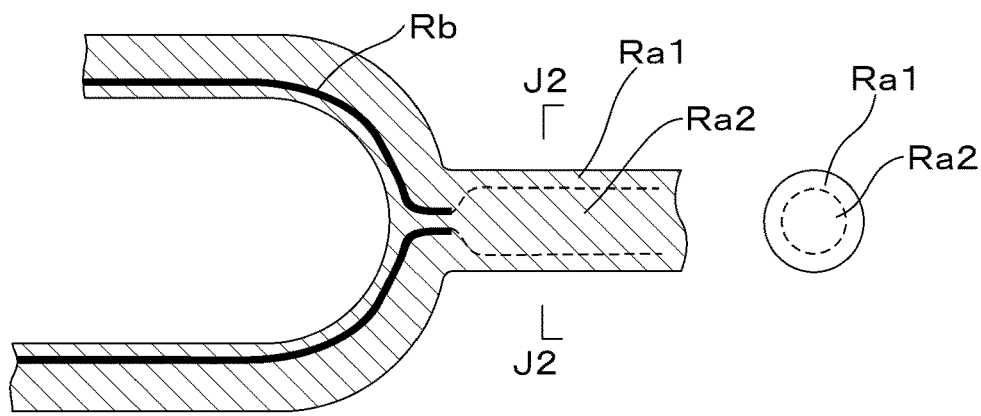
Figure 6C:
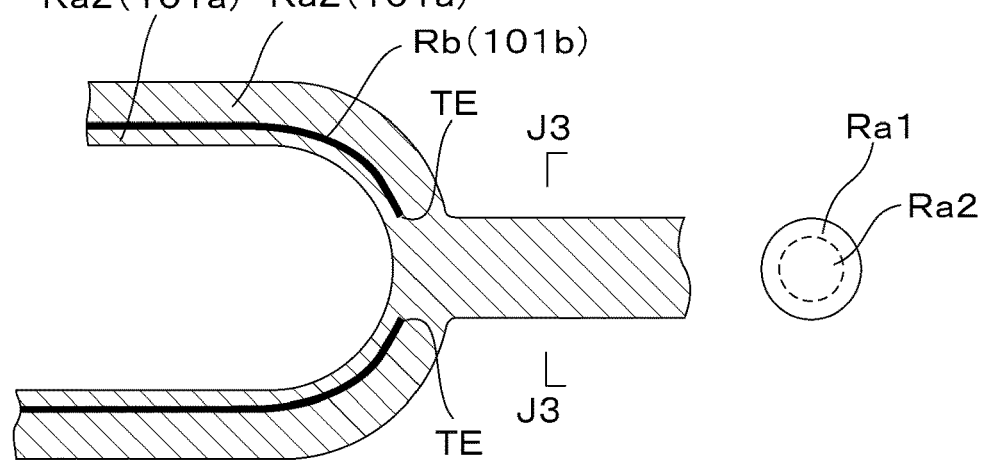

FIGS. 6A, 6B and 6C are schematic explanatory diagrams showing the steps of filling the cavity 4 of the mold 1 with the PET resin Ra and the barrier resin Rb in the above-described steps of the injection pattern of FIG. 5. The filling of the cavity 4 proceeds in the order of A→B→C in FIG. 6. On the right side of A, B and C, there are given cross-sectional views taken from lines J1-J1, J2-J2, and J3-J3. These cross-sectional views show separately the PET resin supplied through the outer flow channel 15a as Ra1, and the PET resin supplied through the inner flow channel 15c as Ra2.

When the barrier resin Rb is supplied through the middle flow channel 15b as described above, a reduced feed rate is used for the PET resin Ra2 from the inner flow channel 15c. Therefore, as seen in FIG. 6A, the barrier resin Rb is laminated with the PET resin layers Ra1 and Ra2 in a slim, cylindrical shape with a small diameter. If the filling is completed in the state shown in FIG. 6C, passing through the state of FIG. 6B, under this laminated condition that the barrier resin Rb takes a small, cylindrical shape, then like the preform 101 in FIG. 1, the trailing edge, TE, of the barrier resin layer 101b would have a length Lb of 5 mm from the center of the bottom 106, and the trailing edge, TE, can be allowed to come close to the outer peripheral edge of the gate vestige 107.

Figure 7A:
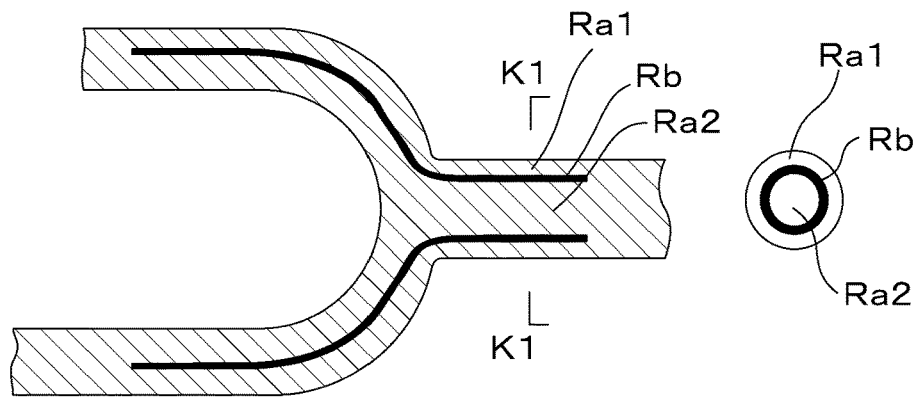
FIGS. 7A-7C are each a schematic explanatory diagram showing the steps of filling the mold cavity with molten resins using another injection pattern.
Figure 7B:
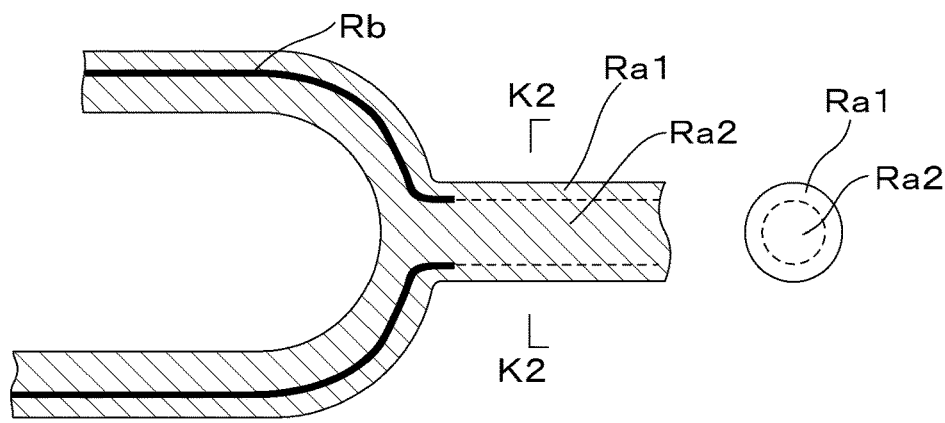
Figure 7C:
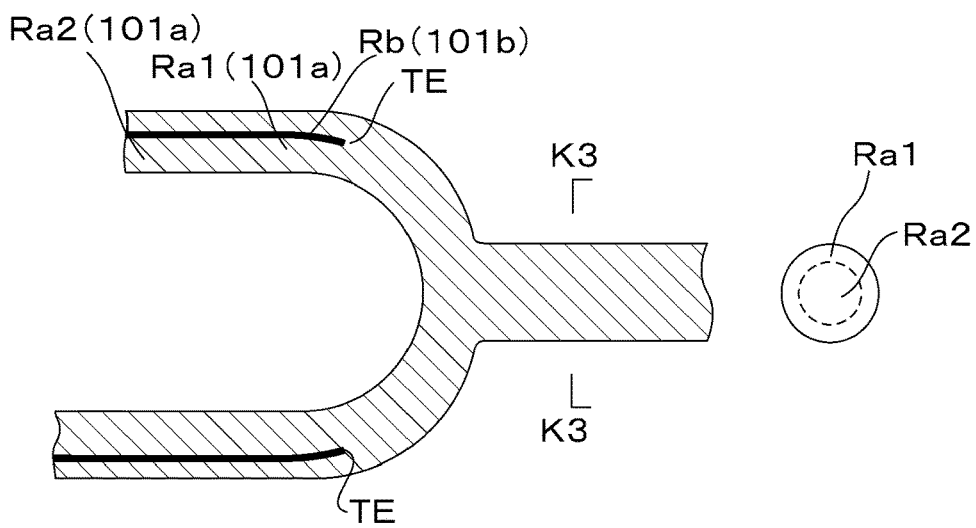
Figure 10A:
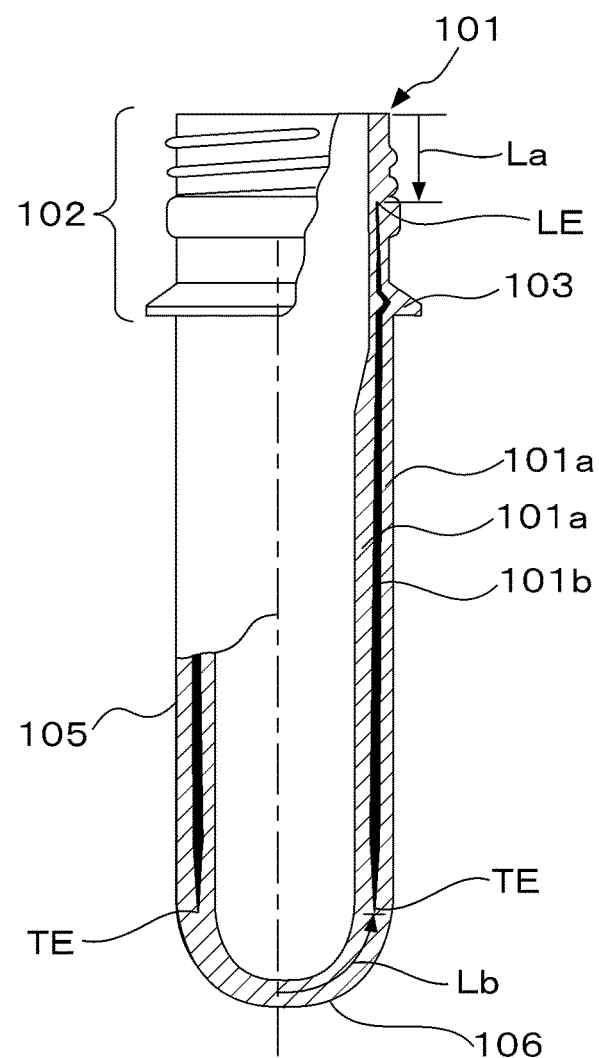
FIG. 10A is a front view, with a partially taken vertical section, of an example of a conventional preform.
Figure 10B:
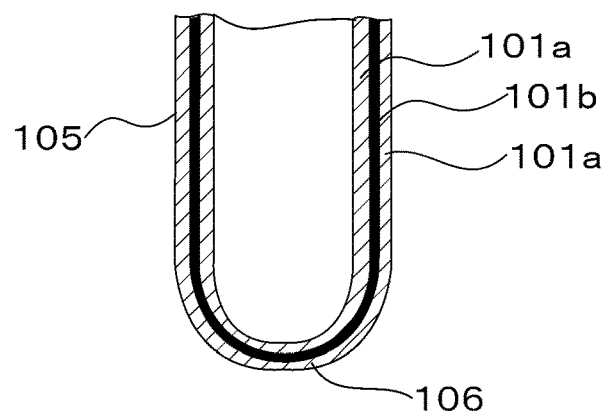
FIG. 10B shows an example of another preform.
Figure 13A:
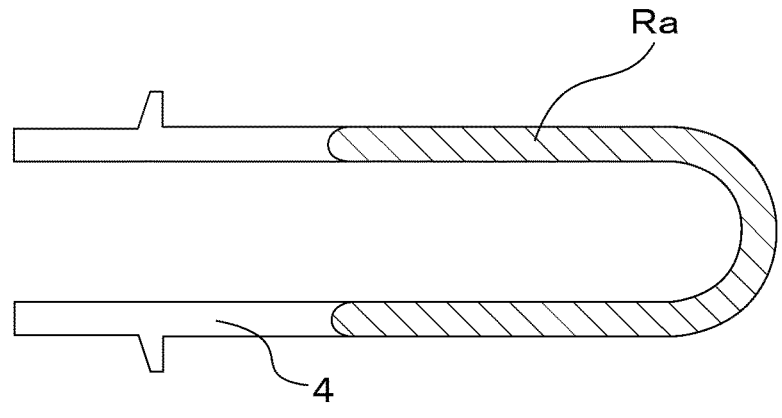
FIGS. 13A-13C are each an explanatory diagram showing the steps of filling the mold cavity with molten resins using the injection pattern of FIG. 12.
Figure 13B:
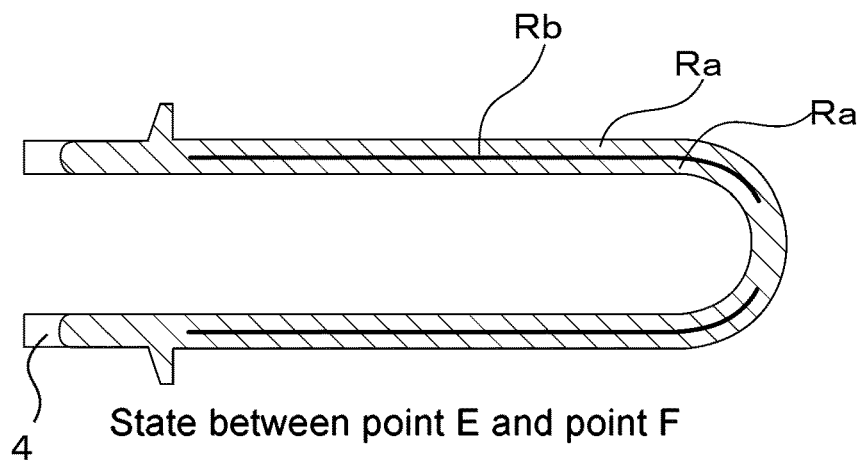
Figure 13C:
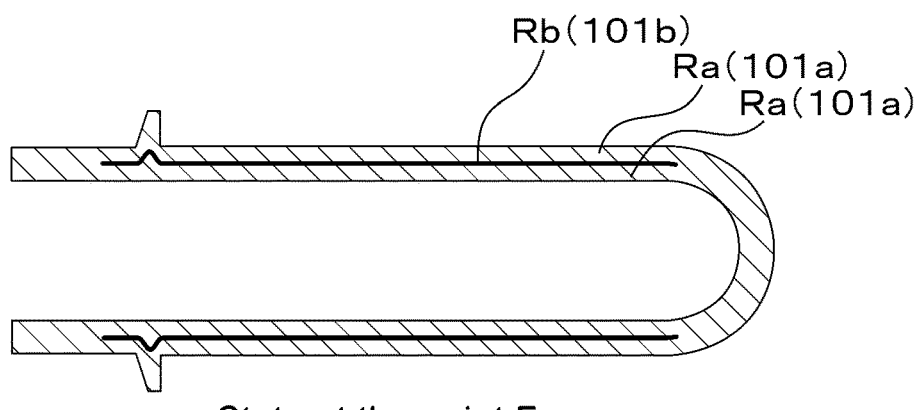

FIG. 7 is also a schematic explanatory diagram showing the steps of filling the cavity with the PET resin Ra and the barrier resin Rb, but in this case, the preform is injection molded while the forefront 20p of the shut-off pin 20 is kept at the Ls1 position of 18 mm without moving the forefront 20p in the injection pattern of FIG. 5. This embodiment corresponds to a comparative example wherein the above-described Ls is set at 14.55 mm. Filling of the cavity 4 proceeds in the order of A→B→C. Like in FIG. 6, the cross-sectional views taken from lines K1-K1, K2-K2, and K3-K3 are shown on the righthand side of the respective vertical sections The injection molding based on the injection pattern, wherein the forefront 20p is kept at the length Ls1 of 18 mm, is similar to a conventional molding process shown in FIGS. 11-13. When the barrier resin Rb is supplied from the middle flow channel 15b, there is no change in the rate of supply of the PET resin Ra2 from the inner flow channel 15c. Therefore, as can be seen in FIG. 7A, the barrier resin Rb is in a cylindrical shape having a large diameter when the barrier resin Rb is sandwiched between the PET resin layers Ra1 and Ra2. When the filling operation passes through the state of FIG. 7B and is complete in the state of FIG. 7C, the trailing edge, TE, of the barrier resin layer 101b is located at a somewhat distant point on the downstream side (located above in FIG. 10) just like the preform 101 of FIG. 10A. The length Lb from the center of the bottom 106 was 19.4 mm.

From a comparison of FIG. 6 with FIG. 7, it is found that at an Ls of 14.5 mm shown in FIG. 6 and with a smaller rate of the PET resin Ra2 supply, the barrier resin layer 101b made of the barrier resin Rb is located nearer to the inner peripheral surface of the preform 101, as shown in FIG. 6C, than in the example shown in FIG. 7, due to the effect of a slim, cylindrical shape of the barrier resin Rb.

Preforms were molded according to the injection pattern shown in FIG. 5 by setting the forefront 20p of the shut-off pin 20 shown in FIG. 3 at five positions Ls of 14.00 mm, 14.55 mm, 14.60 mm, 15.10 mm, and 18.00 mm in a period ranging from ts1 to ts2. The preforms in examples 1 to 5 were measured for the length La of the leading edge, LE, and the length Lb of the trailing edge, TE, and the biaxially stretched, blow molded bottles made from these preforms were measured for oxygen transmission rate (OTR cc/day). FIG. 8 is a table compiled from the results of measurements for La, Lb, and OTR for each Ls. In the cases of Examples 2 to 4, only the position Ls was changed in the pattern of FIG. 5. Meanwhile, in Example 1, time ts1, i.e., a time when the forefront 20p is located at a position Ls of 14.00 mm in the pattern of FIG. 5, is set at a middle point between tb1 and tb2, i.e., a time zone where the barrier resin Rb is supplied. FIG. 9 is a front view of the biaxially stretched, blow molded bottle. The bottle 201 has a neck 202, a neck ring 203, a tapered shoulder 204, a cylindrical body 205, and a bottom 206, and has a total height of 160 mm. The body 205 has an outer diameter of 70 mm. Oxygen transmission rate for the bottle 201 was measured at 23 degrees C. and an oxygen partial pressure of 21%, using OX-TRAN10/50 of Modern Controls, Inc.

In Example 1 where Ls is 14.00 mm, the supply of the PET resin Ra2 from the inner flow channel 15c is shut down from time ts1 on when the forefront 20p is located at position Ls. Therefore, the barrier resin layer would take a slim, columnar shape in the vicinity of the trailing edge of the barrier resin Rb, rather than a slim, cylindrical shape such as shown in FIG. 6A. As a result, the trailing edge, TE, would entirely cover the bottom 106 of the preform 101 in an encapsulated state show in FIG. 10B. In this case, the bottle has a high oxygen barrier property, as found by an OTR of 0.0026 cc/day, but since the gas barrier resin layer 101b covers the gate vestige 107, problems arise because a stretching rod may breaks through the inner PET resin layer 101a, or because the bottom 206 of the bottle 201 may deform. These problems would lead to a low yield and low productivity. Even if the trailing edge, TE, does not become continuous in the bottom 106 of the preform 101, there will arise similar problems found in the case where the gas barrier resin layer 101b entirely covers the gate vestige 107. Therefore, it is necessary for the trailing edge, TE, of the gas barrier resin layer 101b to be located outside the outer peripheral edge of the gate vestige 107.

In Example 2 where Ls is 14.55 mm, the trailing edge, TE, has a position of 5.0 mm on an average, and is located between the outer peripheral edge of the gate vestige 107 and a peripheral edge corresponding to a lower end of an inner peripheral surface 105p of the body 105, as shown in FIG. 1B, with other factors being similar to the above embodiment. The bottle had an OTR of 0.0028 cc/day, which was similar to Example 1 where Ls was 14.00 mm, and the bottom was encapsulated. In Example 3 where Ls was 14.60 mm, the length Lb of the trailing edge, TE, was 11.5 mm, and the bottle had an OTR of 0.0075 cc/day. In Example 4 where Ls is 15.10 mm, the length Lb of the trailing edge, TE, was 15.9 mm.

Example 5 having an Ls of 18.00 mm is a comparative example described in FIG. 7. In this case, the length Lb of the trailing edge, TE, was 19.4 mm, and the OTR was 0.0236 cc/day. As compared to Example 2 having an Ls of 14.55 mm, the OTR was about 8.5 times as much as that of Example 2. It is found in this case that the oxygen barrier property has decreased to a large extent. Example 5 has the OTR about 3 times as much as the OTR of Example 3 having an Ls of 14.60 mm. On the contrary, even at an Ls of 14.60 mm with the trailing edge, TE, having the length Lb of 11.5 mm, it is found that the bottle would have a considerably better oxygen barrier property, as compared to any conventional molding process.

As regards the leading edge, LE, of the gas barrier resin layer 101b, the length La of the leading edge, LE, is found to decrease gradually from 21.7 mm to 17.6 mm under the condition that the Ls ranges from 14.00 mm to 18.00 mm. This La is a factor that can be controlled by adjusting the time interval between time ta1 and time tb1 in the injection pattern of FIG. 5.

An overall comparison of five examples having an Ls in the range of 14.00 mm to 18.00 mm reveals that slight displacement of the forefront 20p of the shut-off pin 20 leads to a large change in the length Lb of the trailing edge, TE, and that this change greatly affects the oxygen barrier property of the bottle 201 molded under this change. By contrast, this indicates that according to the molding device of this invention, flow adjustment can be precisely achieved in quite a short period of time, and the position of the trailing edge, TE, of the barrier resin layer 101b can be controlled in a high degree of accuracy, simply by sliding the shut-off pin 20 in a little bit of movement, combined with the use of a servomechanism for precision control of the position of the forefront 20p of the shut-off pin 20.

This invention has been described above with respect to preferred embodiments, but it is to be understood that this invention should not be construed as limitative to these embodiments. In the above embodiments, description was made on a preform having a laminar structure of 2-resins/3-layers, in which the second-resin layer comprising a barrier resin is laminated with the main-resin layers made of a PET resin, on an injection molding process and a molding device for injection molding such a preform. However, this invention is not limited to the 2-resin/3-layer laminar structure. Within a technical idea of this invention that the mode of laminating the main-resin layers with the second-resin layer is controlled at high productivity and in a high degree of accuracy, various other laminar structures are feasible, such as a colored resin layer used as an intermediate layer for a decorative purpose.

As regards the injection molding device, the device shown in FIG. 2 is a mere example. Many variations can be used for the details of the device. Also as regards the injection molding process, the injection pattern shown in FIG. 5 is only an example. For instance, according to the pattern of FIG. 5, the forefront 20p of the shut-off pin 20 is moved to a position Ls after the injection starting time tb1 of the barrier resin Rb, but the forefront 20p can be moved to Ls before the injection starting time tb1 of the barrier resin Rb.

The main resin for molding the preform is not limited to the PET resin. Use can be made of the resins conventionally used in the biaxially stretched, blow molded bottles, such as polypropylene. As the second resin, not only gas barrier resins but also those resins having other functions or resins for a decorative purpose can be used. As the gas barrier resin, MXD6 nylon is used, but other nylon resins and ethylene vinyl alcohol copolymers (EVOH) can also be used.

INDUSTRIAL APPLICABILITY

The preforms obtained by using the injection molding device of this invention can be employed to produce those bottles having the intermediate layer, such as the barrier resin layer, laminated especially in the neighborhood of the bottom in a highly controlled manner.

DESCRIPTION OF REFERENCE SIGNS

1. Mold
2. Core mold
3. Cavity mold
4. Cavity
5. Pin gate
11. Nozzle section
12a, 12b. Guide channel
14a1, 14a2, 14b. Manifold
15a. Outer flow channel
15b. Middle flow channel
15c. Inner flow channel
15as, 15bs, 15cs. Diameter-reduced flow channel
17c. Outlet
19. Joined flow channel
20. Shut-off pin
20p. Forefront
21. First mandrel
22. Second mandrel
23. Third mandrel
Ls0, Ls, Ls1. Position of the forefront of the shut-off pin
Ra. Main resin (PET resin)
Rb. Second resin (Barrier resin)
Sa. First feeder
Sb. Second feeder
101. Preform
101a. Main-resin layer (PET resin layer)
101b. Second-resin layer (Barrier resin layer)
102. Neck
103. Neck ring
105. Body
105p. Inner peripheral surface
106. Bottom
107. Gate vestige
LE. Leading edge
TE. Trailing edge
La. Length to the leading edge
Lb. Length to the trailing edge
201. Bottle
202. Neck
203. Neck ring
204. Shoulder
205. Body
206. Bottom

The invention claimed is:

1. A device for injection molding a preform in a test tube shape for biaxial stretching and blow molding use, in which preform a second-resin layer serving as an intermediate layer is laminated with main-resin layers that make up a shape of the preform, the device having a nozzle section for forming a joined resin fluid by allowing a second resin for forming the second-resin layer to join a main resin for forming the main-resin layers, and having a mold disposed ahead of the nozzle section, wherein the nozzle section integrally forms comprises inside:
three cylindrical layer-forming flow channels including an outer flow channel, a middle flow channel, and an inner flow channel in an outside-to-inside order,
a joined flow channel connected to these three flow channels and extended to the head of the nozzle section,
a manifold having a conical shape that guides the main resin to the outer flow channel and to the inner flow channel,
an other manifold having a conical shape that guides the second resin to the middle flow channel,
wherein the main resin is passed through the outer flow channel and inner flow channel, and the second resin is passed through the middle flow channel, and
a rod-like shut-off pin disposed on an inner side of the inner flow channel and slidably inserted therein, wherein an outlet of the inner flow channel, which is open to the joined flow channel, is shut off or opened, and a degree of aperture can be adjusted, by controlling the position of a forefront of the shut-off pin.

2. The injection molding device according to claim 1 wherein the device comprises:
a first resin feeder for feeding the main resin and a second resin feeder for feeding the second resin,
wherein the two resins are joined together in a cylindrical shape to form a joined resin fluid in joined flow channel, which fills a cavity by being injected therein by way of a pin gate disposed at a position of the cavity of the mold corresponding to the center of a bottom wall of the preform.

3. The injection molding device according to claim 2 wherein the inner flow channel has a diameter-reduced flow channel in an end portion, where the diameter is reduced in a tapered manner to a level adequate for the joined flow channel.

4. The injection molding device according to claim 1 wherein the sliding movement of the shut-off pin is controlled by a servomechanism.

5. The injection molding device according to claim 1 wherein the inner flow channel has a diameter-reduced flow channel in an end portion, where the diameter is reduced in a tapered manner to a level adequate for the joined flow channel.

6. The injection molding device according to claim 2 wherein the sliding movement of the shut-off pin is controlled by a servomechanism.

7. The injection molding device according to claim 3 wherein the sliding movement of the shut-off pin is controlled by a servomechanism.

8. The injection molding device according to claim 5 wherein the sliding movement of the shut-off pin is controlled by a servomechanism.

* * * * *